US007288290B2

(12) United States Patent
Chao et al.

(10) Patent No.: US 7,288,290 B2
(45) Date of Patent: Oct. 30, 2007

(54) PROCESS FOR APPLYING MULTI-COMPONENT COMPOSITE COATINGS TO SUBSTRATES TO PROVIDE SOUND DAMPING AND PRINT-THROUGH RESISTANCE

(75) Inventors: Tien-Chieh Chao, Mars, PA (US); Umesh C. Desai, Wexford, PA (US); Marvis E. Hartman, Pittsburgh, PA (US); Klaus Heinicke, Hilden (DE); Kaliappa G. Ragunthan, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 11/136,155

(22) Filed: May 24, 2005

(65) Prior Publication Data

US 2006/0003104 A1   Jan. 5, 2006

Related U.S. Application Data

(60) Provisional application No. 60/574,631, filed on May 26, 2004.

(51) Int. Cl.
*B05D 5/00* (2006.01)
*B05D 1/02* (2006.01)
*B05D 1/38* (2006.01)

(52) U.S. Cl. .............. 427/407.1; 427/409; 427/410; 427/372.2; 427/421.1

(58) Field of Classification Search ............ None
See application file for complete search history.

(56) References Cited

U.S. PATENT DOCUMENTS 3,399,103 A   8/1968   Salyer et al.
3,833,404 A   9/1974   Sperling
4,346,782 A   8/1982   Bohm
4,374,172 A   2/1983   Schwarz et al.
4,739,019 A   4/1988   Schappert et al.
5,227,592 A * 7/1993  Kosters et al. .............. 181/207
5,403,623 A   4/1995   Kosters et al.
5,470,886 A   11/1995  Makhlouf et al.
5,569,733 A   10/1996  Donnelly et al.
5,741,824 A   4/1998   Butschbacher et al.
5,756,555 A   5/1998   Wesch et al.
5,761,184 A   6/1998   Dauber et al.
5,939,179 A   8/1999   Yano et al.
5,994,422 A   11/1999  Born et al.
6,110,985 A   8/2000   Wheeler
6,309,985 B1  10/2001  Virnelson et al.
6,361,643 B2  3/2002   Born et al.
6,521,706 B1  2/2003   Desai et al.
2003/0211329 A1 11/2003 Fox ......................... 428/416

FOREIGN PATENT DOCUMENTS

DE    101 01 103 A1    1/2001
EP    0 077 987 B1    10/1982
FR    2 764 825 A1    6/1998
WO    WO 02/04565 A2   1/2002
WO    WO 02/083461 A1 10/2002
WO    WO 03/101631 A1 12/2003

* cited by examiner

*Primary Examiner*—William P Fletcher, III
(74) *Attorney, Agent, or Firm*—Deborah M. Altman; Robert A. Diaz

(57) ABSTRACT

A process is provided for applying multi-component composite coating compositions to substrates to provide sound damping and print-through resistance. The process includes applying at least one first coating composition to a surface of the substrate; applying at least one second coating composition over the first; and curing one or both of the first and second compositions, thereby forming a multi-layered coated substrate. The coating compositions may be applied by a method selected from spraying, extruding, brushing, and/or dipping.

23 Claims, No Drawings

PROCESS FOR APPLYING MULTI-COMPONENT COMPOSITE COATINGS TO SUBSTRATES TO PROVIDE SOUND DAMPING AND PRINT-THROUGH RESISTANCE

CROSS-REFERENCE TO RELATED APPLICATIONS

This application claims the benefit of priority from U.S. Provisional Patent Application No. 60/574,631, entitled "Process for Applying Multi-Component Composite Coatings to Substrates to Provide Sound Damping and Print-Through Resistance, filed May 26, 2004.

FIELD OF THE INVENTION

The present invention relates to processes for applying multi-component composite coatings to substrates, in particular to provide sound damping, reinforcement, and print-through resistance properties thereto.

BACKGROUND OF THE INVENTION

Automobile manufacturers have tried in recent years to reduce material costs, and one way of doing so is to use thinner gauge metal sheets for automotive body panels and other parts. While providing initial raw material cost savings, the thinner gauge metal presents some drawbacks. Thinner metals have less impact strength and also have lowered sound damping capacity. To overcome these drawbacks, automotive manufacturers have begun to apply sound damping, anti-flutter, and body panel reinforcement (BPR) coatings to the inside of body panels. Coatings on floorpans, firewalls, insides of door panels, and deck lids can be used to dampen or reduce road and engine noise, preventing sounds from traveling into the passenger compartment of the motor vehicle. Likewise, anti-flutter compositions are commonly used to prevent vibrations of doors and deck lids. They are usually extruded as beads or drops, often called "chocolate drops" in the industry, between reinforcing metal bars and the body panel. By varying the types and amounts of components, these compositions can provide different degrees of expansion and strength from the very soft to the very hard. The coatings that have been developed for the above purposes are sometimes solid laminate pre-cut sheets or pads that must be hand-applied to a substrate. Only small areas can be covered at one time, making the application of the layers time consuming and expensive.

Another drawback of commercial sheets and solid patch-type sound damping products is that the optimum performance is limited to narrow performance temperature ranges; their sound dissipation values drop off at the low and high end of an ambient temperature range. While newer, sprayable technologies reduce time and labor expenses, they likewise can perform well over only narrow temperature ranges.

Additionally, some of the sprayable products may deform the metal upon curing creating a visible defect on outer painted surfaces. In some cases it is visible only at cold temperatures. This phenomenon is often referred to as "print-through", "read-through", "telegraphing" and/or "ghosting". It is desirable to eliminate such appearance defects.

Many sprayable sound-damping coatings must rely on the use of plasticizers to achieve a sprayable viscosity. Plasticizers can, and often do, present environmental concerns.

Accordingly, it would be desirable to provide a method of applying multiple coating compositions to substrates, to provide sound damping and reinforcement properties while minimizing print-through, without the drawbacks of the prior art.

SUMMARY OF THE INVENTION

The present invention is directed to a process for applying a multi-component composite sound damping coating to a substrate comprising:
 a) providing a substrate having two major surfaces;
 b) applying at least one first coating composition to at least a portion of at least one major surface of the substrate by a method selected from spraying, extruding, brushing, and/or dipping, wherein the first-applied coating composition comprises a curable film-forming composition comprising:
  (1) at least one polymer having reactive functional groups; and
  (2) at least one curing agent having functional groups reactive with the functional groups of the polymer of (1);
 c) applying at least one second coating composition over at least a portion of the first-applied coating composition by a method selected from spraying, extruding, brushing, and/or dipping, wherein the modulus of elasticity of the first-applied coating composition after curing is at least 50 MPa lower than that of the second-applied coating composition after curing; and
 d) curing one or both of the first-applied and second-applied coating compositions to form a multi-component composite coating on the substrate; wherein the coated substrate has a sound damping value of 0.1 or greater Oberst dissipation factor as determined at a normalized value of 200 Hz in accordance with ASTM E-756-98, over a temperature range of at least 20 Celsius degrees.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

The multi-component composite coating used in the process of the present invention is not intended to include a laminate type composite; i.e., the coating compositions used therein do not comprise and are not applied to solid sheets, films, pads, patches, or panels to be subsequently applied to a substrate by compression, heat, or through the use of adhesives or the like. Rather, the coating compositions used in the process of the present invention are liquid. By "liquid" is meant that the compositions have a viscosity that allows them to be at least extrudable. In one embodiment of the present invention the compositions have a viscosity that allows them to be at least pumpable, and often the compositions have a viscosity that allows them to be at least sprayable. The sound damping compositions of the present invention typically do not require plasticizers as softening and dispersing media. However, conventional plasticizers may be included in the composition if desired. The composition(s) of the present invention can be warm applied, for example, at a temperature of 50° C. to 60° C. to facilitate pumping and spraying.

Note that the multi-component composite coating can be more than two layers. For example, more than one first layer, which may be the same or different, and/or more than one second layer, which may be the same or different, may be applied to the substrate as desired. Additionally, steps may be performed sequentially or two or more steps may be combined and performed simultaneously within the scope of the invention. Steps (b) and (c) may also be performed repetitively. Moreover, additional steps such as cleaning, drying, applying other coating compositions, curing individual layers, and the like may be performed at any time during the process without departing from the spirit and scope of the invention. The multi-layered substrate maintains a high damping loss factor over a wide temperature range, at least a 20 Celsius degree range. The multi-layer coating also aids in achieving read-through or print-through resistance.

Liquid compositions that are suitable for use in the present invention include liquid resin systems that are 100 percent solids, liquid resins that are dissolved or dispersed in a liquid medium, and solid particulate resins that are dispersed in a liquid medium. Liquid media may be aqueous based or organic solvent based.

By "polymer" is meant a polymer including homopolymers and copolymers, and oligomers. By "composite material" is meant a combination of two or more differing materials.

Substrates suitable for use in the process of the present invention can include any of a variety of known substrates. For example, suitable substrates can include rigid metal substrates such as ferrous metals, aluminum, aluminum alloys, copper, and other metal and alloy substrates typically used in the manufacture of automobile bodies. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. Non-metallic substrates, such as polymeric or elastomeric substrates also can be used where appropriate.

The surfaces to which the multi-component composite coating is applied in the process of the present invention typically are non-Class A surfaces of substrates, typically automotive substrates. "Class A" surfaces are those surfaces which will become part of the most visible portions of the resulting article. For example, in automotive applications, Class A surfaces can include the outer portions of the door panels, hood, trunk, quarter panels, side panels, etc., which are exposed directly to the weather and are readily visible to the consumer. "Non-Class A" surfaces are those surfaces which are destined for non-highly visible areas or even non-visible areas of the article, such as in the case of an automotive substrate, the inside of the door panel, inside surface of the quarter and side panels, underneath the hood or trunk, etc. Although an aesthetic, durable finish is required for the Class A surfaces, applying such aesthetic finishes onto the non-Class A surfaces typically is not desirable because such coatings are costly and time-consuming to apply. However, the non-Class A surfaces at least should be coated with an anticorrosion coating to prevent rust or corrosion. Moreover, it is noteworthy that the multi-component composite coating applied to non-Class A surfaces in accordance with the process of the present invention affects the appearance of coatings applied to the opposing (Class A) surface by preventing print-through as discussed above.

The thickness of the substrate typically ranges from 0.25 to 3.18 millimeters (mm) (10 to 125 mils), or from 0.6 to 1.2 mm (23.6 to 47.2 mils), although the thickness can be greater or less, as desired. The width of a coil strip generally ranges from 30 to 183 centimeters (12 to 72 inches), although the width of the substrate can vary depending upon its shape and intended use.

Before depositing any treatment or coating compositions upon the surface of the substrate, it is common practice, though not necessary, to remove foreign matter from the surface by thoroughly cleaning and degreasing the surface. Such cleaning typically takes place after forming the substrate (stamping, welding, etc.) into an end-use shape. The surface of the substrate can be cleaned by physical or chemical means, such as mechanically abrading the surface or cleaning/degreasing with commercially available alkaline or acidic cleaning agents which are well known to those skilled in the art, such as sodium metasilicate and sodium hydroxide. A non-limiting example of a cleaning agent is CHEMKLEEN 163, an alkaline-based cleaner commercially available from PPG Industries, Inc.

Following the cleaning step, the substrate may be rinsed with deionized water or an aqueous solution of rinsing agents in order to remove any residue. The substrate can be air dried, for example, by using an air knife, by flashing off the water by brief exposure of the substrate to a high temperature or by passing the substrate between squeegee rolls.

In the process of the present invention, the substrate to be coated with the multi-component composite coating may be a bare, cleaned surface; it may be oily, pretreated with one or more pretreatment compositions, and/or prepainted with one or more coating compositions, primers, etc., applied by any method including, but not limited to, electrodeposition, spraying, dip coating, roll coating, curtain coating, and the like.

The first-applied coating composition is applied to at least a portion of at least one major surface of the substrate. The first-applied coating composition may be applied to the substrate by one or more of a number of methods including, but not limited to, spraying, extruding, brushing, and/or dipping. As mentioned above, the composition has a viscosity that allows it to be at least extrudable. In a particular embodiment, the first coating composition is applied by spraying.

The first-applied coating composition which is applied to the substrate in step (b) of the process of the present invention may be one or more of any coating composition known in the art of surface coatings. In one embodiment the first-applied coating composition has a modulus of elasticity less than or equal to 400 MPa after drying or curing. The first-applied coating composition may be thermosetting (curable) or thermoplastic, or a mixture of thermosetting and thermoplastic resins. An example of a suitable thermoplastic resin is one comprising polybutadiene. The first-applied coating composition may comprise any of a variety of polymers known in the art. For example, the polymer may be selected from acrylic polyester, polyurethane, polybutadiene, polyether, polycarbonate, polyamide, polyurea, polyglycidyl ethers of polyhydric alcohols, and/or polyglycidyl ethers of polyphenols. As used herein, the term "polybutadiene" is intended to include hydrogenated polybutadiene and epoxidized polybutadiene. When the first-applied coating composition is thermosetting, the polymer may comprise any of a variety of reactive functional groups. In an embodiment of the present invention, the polymer has reactive functional groups selected from epoxy, isocyanate, blocked isocyanate, hydroxyl, acid, carbamate, and/or amino groups. A thermosetting coating composition typically further comprises at least one curing agent capable of reacting with the functional groups of the polymer.

For purposes of the present invention, the modulus of elasticity as discussed in the specification and the claims, is the modulus measured in accordance with ASTM E1640-99, the Test Method for Assignment of the Glass Transition Temperature By Dynamic Mechanical Analysis using a TA Instrument DMA 2980 Dual Cantilever (heating 3° C./minute ranging from −100° C./−40° C. to 100° C. at 1 Hz frequency, at ±20 μm Amplitude and 120% auto strain).

If necessary, the first-applied coating composition may further comprise an essentially thermoplastic resin different from the polymer discussed immediately above, present in an amount—up to 90 percent by weight based on the total weight of the first-applied composition. The thermoplastic resin typically is present in an amount effective to retard shrinkage of the first-applied coating composition upon curing.

Non-limiting examples of suitable thermoplastic resins include polymers such as polyvinyl acetate; aromatic vinyl polymers; vinyl copolymers having vinyl aromatic hydrocarbons as monomer components such as polystyrene, styrene-butadiene copolymers, styrene-divinylbenzene copolymers and styrene-acrylonitrile copolymers; saturated polyesters including saturated aliphatic polyesters such as polyneopentyl adipate, polypropylene adipate and poly epsilon-caprolactone; polyacrylates such as polyalkyl (meth) acrylates having alkyl groups with 1-8 carbon atoms, polymethacrylates or polyalkyl(meth)acrylates obtained by polymerization of methyl methacrylate, isobutyl methacrylate and 2-ethylhexyl acrylate; saturated polyester urethanes, and the like. Other useful thermoplastic polymers include polybutadienes, polybutadiene/acrylonitriles, polybutadiene/acrylonitrile, polybutadiene styrenes, polystyrene thermoplastic polymers, polyvinyl chlorides, polyvinyl chloride/acetates, polyvinyl acetate. Also included are saturated polyethers, including those with a polyurethane chain extension as known to those skilled in the art.

When the first-applied coating composition icomprises a thermosetting composition, it further comprises at least one curing agent having functional groups that are reactive with the functional groups on the polymer. The curing agent may be selected from any of a variety of art-recognized curing agents, provide the curing agent comprises functional groups which are reactive with those of the previously described polymers. For example, suitable curing agents can include, but are not limited to aminoplasts, polyisocyanates, including blocked isocyanates, polyepoxides, beta-hydroxyalkylamides, polyacids, anhydrides, organometallic acid-functional materials, polyamines, polyamides, polyols, polyurea, urea, dicyandiamide, and mixtures of any of the foregoing. It should be understood that the blocked isocyanates can be blocked using any of the blocking agents known in the art for this purpose. For example, the blocking agents can include, but are not limited to suitable monoalcohols, phenolic compounds, glycol ethers, oximes, lactams, heterocyclic amines, imidazoles, and/or amnes. Note that the terms "curing agent" and "crosslinking agent" are used interchangeably.

In a particular embodiment of the present invention, the first-applied coating composition comprises (1) at least one polyurethane, wherein the polyurethane has isocyanate functional groups or at least partially blocked isocyanate functional groups; and (2) at least one curing agent selected from polyols, polyamines, and mixtures thereof. The isocyanate groups of the polyurethane can be at least partially blocked with any of the blocking agents previously discussed with respect to blocked isocyanate curing agents.

The first-applied coating composition may further comprise fillers as are well known in the art. In an embodiment of the present invention such fillers may comprise microparticles having an average particle size prior to incorporation into the composition ranging from 0.5 to 300 microns or 0.5 to 200 microns, or other fillers. Such microparticles may be selected from at least one of vulcanized rubber particles, colloidal silica, calcium modified precipitated silica, ion exchange silica gel, colloidal alumina, and/or colloidal zirconia, and the like.

Examples of other fillers that can be present include finely divided minerals, such as calcium carbonate, magnesium carbonate, talc, mica and/or clay. Metal powders, one or more hollow fillers, such as glass and plastic microspheres, beads and milled or chopped glass fibers and strands also can be used as fillers.

The shape (or morphology) of the particles can vary depending upon the specific embodiment of the present invention and its intended application. For example, generally spherical morphologies such as solid beads, microbeads, or hollow spheres can be used, as well as particles that are cubic, platy, or acicular (elongated or fibrous). Additionally, the particles can have an internal structure that is hollow, porous, or void free, or a combination of any of the foregoing; e.g., a hollow center with porous or solid walls. For more information on suitable particle characteristics see H. Katz et al. (Ed.), *Handbook of Fillers and Plastics* (1987) at pages 9-10, which are specifically incorporated herein by reference.

It will be recognized by those skilled in the art that mixtures of one or more types of particles and/or particles having different average particle sizes may be incorporated into the first coating composition to impart the desired properties and characteristics to the composition in which they are to be used.

The amount of fillers present in the first-applied coating composition generally ranges from 0 to 70 weight percent of the total resin solids of the first coating composition, but the specific amount can vary depending on the particular end-use application of the composition. Most often, the amount of the fillers ranges from 5 to 40 weight percent of the total resin solids of the composition. Ground rubber particles may be used, for example, to flexibilize the cured composition. The amount of rubber can be balanced with the amount of other fillers to achieve the desired viscosity of the composition and desired stiffness of the cured composition.

The first-applied coating composition may further contain a variety of additives including pigments, reinforcements, thixotropes, plasticizers, extenders, stabilizers and antioxidants, and blowing agents, for example azodicarbonamide compounds available from Crompton Corporation under the tradename CELOGEN.

In one embodiment of the present invention, step (c), which comprises application of the second coating composition, is performed immediately after step (b) such that the second-applied coating composition is applied over the first-applied coating composition "wet-on-wet", with no drying or curing of the first-applied composition prior to application of the second. Also, step (b) and step (c) may be performed simultaneously wherein, for example, the first and second coating compositions may be co-extruded onto the substrate such as by co-extrusion using a tandem nozzle applicator. It should be understood that the application method for the first-applied composition is independent of the method used to apply the second-applied composition. For example, the first-applied composition may be applied by spraying and the second-applied composition may be applied by extrusion, or vice versa, or both may be applied by spraying.

Alternatively, after application of the first coating composition and before application of the second coating composition (i.e., between steps (b) and (c) of the process) the first-applied composition may be dried or cured. For example, the coated substrate may optionally be heated to a temperature and for a time sufficient to substantially cure any curable resins in the first-applied coating composition. The composition can be dried or cured by standing at ambient temperature, or by a combination of ambient temperature cure and baking, or by baking alone. The composition can be cured at ambient temperature typically in a period ranging from 1 hour to 48 hours, such as from 3 hours to 5 hours. If ambient temperature and baking are utilized in combination, the composition is typically allowed to stand for a period of from 5 hours to 24 hours followed by baking at a temperature of from 75° C. to 200° C., such as from 100° C. to 150° C., for a period of time ranging from 20 minutes to 1 hour. However, no curing is required between the first layer and the second layer for lower processing and capital cost.

As used herein, the term "substantially cure" as used in connection with a composition, e.g., "a curable composition," shall mean that any crosslinkable components of the composition are at least partially crosslinked. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen. This method determines the glass transition temperature and crosslink density of free films of coatings or polymers. These physical properties of a cured material are related to the structure of the crosslinked network.

According to this method, the length, width, and thickness of a sample to be analyzed are first measured, the sample is tightly mounted to the Polymer Laboratories MK III apparatus, and the dimensional measurements are entered into the apparatus. A thermal scan is run at a heating rate of 3° C./min, a frequency of 1 Hz, a strain of 120%, and a static force of 0.01N, and sample measurements occur every two seconds. The mode of deformation, glass transition temperature, and crosslink density of the sample can be determined according to this method. Higher crosslink density values indicate a higher degree of crosslinking in the coating.

The second-applied coating composition is applied over (i.e., on top of) at least a portion of the first coating composition. The second-applied coating composition may be applied by one or more of a number of methods including spraying, extruding, brushing, and/or dipping. The second-applied composition has a viscosity that allows it to be at least extrudable. In a particular embodiment, the second coating composition is applied by spraying. The second-applied coating composition may be the same or different from the first-applied coating composition. In an embodiment of the present invention, the second-applied coating composition is different from the first-applied composition.

The second-applied coating composition applied to the substrate in step (c) of the process of the present invention may be one or more of any coating composition known in the art of surface coatings, provided the modulus of elasticity of the first-applied coating composition after curing is at least 50 MPa lower than that of the second-applied coating composition after curing, or at least 500 MPa lower, or at least 1000 MPa lower, or at least 2000 MPa lower. In an embodiment of the present invention the second-applied composition has a modulus of elasticity greater than or equal to 100 MPa at 20° C. after any necessary curing The second-applied coating composition may be a thermosetting (curable) composition, a mixture of thermosetting and thermoplastic compositions, or a thermoplastic composition. An example of a suitable thermoplastic composition is one that comprises polybutadiene, such as mentioned above regarding the first-applied coating composition, and polyalkyl (meth)acrylate (available from Degussa, Rohm Specialty Acrylics as DEGALAN). In one embodiment of the present invention, the second-applied coating composition is a curable composition. In particular, the second-applied coating composition may comprise at least one polymer selected from acrylic, polyester, polyurethane, polybutadiene, hydrogenated polybutadiene, polyether, polyurea, polyamide polycarbonate, polyglycidyl ethers of polyhydric alcohols, polyglycidyl ethers polyphenols, and mixtures thereof. The polymer may have any of a variety of reactive functional groups including but not limited to reactive functional groups selected from at least one of epoxy, isocyanate, blocked isocyanate, hydroxyl, acid, anhydride, carbamate, and/or amino groups. When the second-applied coating composition is thermosetting, it typically further comprises at least one curing agent having functional groups reactive with the functional groups on the polymer. Any of the curing agents previously mentioned with respect to the first-applied composition may be used for this purpose. Mixtures may be used.

In a particular embodiment of the present invention the second-applied coating composition comprises at least one epoxide group-containing material containing at least two epoxide groups per molecule, and a curing agent having functional groups capable of reacting with the epoxide group-containing materials. One useful class of polyepoxides comprises the epoxy polyethers obtained by reacting an epihalohydrin (such as epichlorohydrin or epibromohydrin) with a polyphenol in the presence of an alkali. Suitable polyphenols include resorcinol, catechol, hydroquinone, bis (4-hydroxyphenyl)-2,2-propane, i.e., Bisphenol A; bis(4- hydroxyphenyl)-1,1-isobutane; 4,4-dihydroxybenzophenone; bis(4-hydroxyphenol)-1,1-ethane; bis(2-hydroxyphenyl)-methane; and 1,5-hydroxynaphthalene. One very common polyepoxide is the diglycidyl ether of Bisphenol A.

Another class of polyepoxides are the polyglycidyl ethers of polyhydric alcohols. These compounds may be derived from such polyhydric alcohols as ethylene glycol, diethylene glycol, triethylene glycol, 1,2-propylene glycol, 1,4-butylene glycol, polyoxyalkylene glycols, 1,5-pentanediol, 1,2,6-hexanetriol, glycerol, trimethylolpropane, and bis(4-hydroxycyclohexyl)-2,2-propane.

Another class of polyepoxides are the polyglycidyl esters of polycarboxylic acids. These compounds are produced by the reaction of epichlorohydrin or a similar epoxy compound with an aliphatic or aromatic polycarboxylic acid such as oxalic acid, succinic acid, glutaric acid, terephthalic acid, 2,6-naphthalene dicarboxylic acid and dimerized linoleic acid.

Still another class of polyepoxides are derived from the epoxidation of an olefinically unsaturated alicyclic compound. These polyepoxides are non-phenolic and are obtained by epoxidation of alicyclic olefins, for example, by oxygen and selected metal catalysts, by perbenzoic acid, by acid-aldehyde monoperacetate or by peracetic acid. Among such polyepoxides are the epoxy alicyclic ethers and esters well known in the art.

Useful polyepoxides also include those containing oxyalkylene (ether) groups in the epoxy molecule. Such groups may be pendant to the main molecular chain of the polyepoxide or are part of the main chain itself. The proportion of oxyalkylene groups in the polyepoxide depends upon many factors, including the chain length of the oxyalkylene group, the nature of the epoxy and the degree of water solubility desired.

Another class of polyepoxides consists of the epoxy novolac resins. These resins are obtained by reacting an epihalohydrin with the condensation product of aldehyde and monohydric or polyhydric phenols. A typical example is the reaction product of epichlorohydrin with a phenol-formaldehyde condensate.

The polyepoxides can be partially defunctionalized by carboxylic acids, alcohol, water, phenols, mercaptans or other active hydrogen-containing compounds to give hydroxyl-containing polymers if desired.

As has been stated above, the second coating composition can comprise more than one epoxide group-containing material. Any number of epoxide group-containing materials can be present in the mixture in any desired proportion.

When the second-applied coating composition comprises at least one epoxide group-containing material, it typically contains from 60 percent by weight to 99 percent by weight of epoxide group-containing component. More often there is present from 70 percent by weight to 90 percent by weight of the epoxide group containing-component, the percentages being based upon the total weight of resin solids in the second-applied coating composition.

In addition to the curing agents mentioned above, suitable curing agents for the epoxide(s) include in particular dicyandiamide, poly urea, aliphatic, cycloaliphatic and aromatic polyfunctional amines; and polyamides. Examples of additional suitable amines include ethylene diamine, diethylene triamine, triethylene tetramine, tetraethylene pentamine, 1,4-diaminobutane; 1,3-diaminobutane, hexamethylene diamine, 3-(N-isopropylamino) propylamine, diaminocyclohexane, and polyoxyalkylene amines commercially available under the trademark designation JEFFAMINE®. Aromatic amines, although not preferred, can also be utilized herein, for example metaphenylene diamine, P,P'-methylene dianiline, and 1,4-aminonaphthalene. Also very useful herein are latent curing agents such as boron trifluoride monoethylamine complex, boron trifluoride diethylamine complex, boron trifluoride triethylamine complex, boron trifluoride pyridine complex, boron trifluoride benzyldimethylamine complex, boron trifluoride benzylamine, boron trifluoride etherate, and dicyandiamide. By latent is meant that these materials are inactive until activated by the application of heat. Any of these curing agents may also be used in the first-applied coating composition as desired.

The aforedescribed curing agent may be present in the second-applied coating composition in an amount ranging from 1 percent by weight to 50 percent by weight, such as 3 to 15 percent by weight, the percentages being based on the total weight of the curable composition.

The second-applied coating composition may further comprise reinforcing material selected from at least one of milled glass fibers and milled carbon fibers. The milled fibers are typically about 1/16 inch (1.59 mm) in length. The reinforcing agent is present when necessary in an amount of 8 to 40 percent by weight, often 15 to 30 percent by weight, based on the total weight of the composition.

Examples of fillers that can be present in the second-applied coating composition include any of the filler materials previously described with respect to the first-applied composition, including finely divided minerals, such as calcium carbonate, magnesium carbonate, talc, mica and/or clay. Metal powders, vulcanized rubber particles, one or more hollow fillers, such as glass and plastic microspheres, and beads also can be used as fillers.

The second-applied coating composition may further contain a variety of additives including pigments, reinforcements, thixotropes, plasticizers, extenders, stabilizers and antioxidants as well as blowing agents such as those described above. Each of the first-applied and second-applied compositions can be prepared in a number of ways either as a thermosetting or thermoplastic one-package composition or as a thermosetting two-package composition. Thermosetting one-package compositions can be prepared with the use of a latent curing agent if necessary, as discussed above. Either or both compositions can also be formulated for radiation cure.

As noted above, the multi-component composite coating can be more than two layers. For example, more than one first layer, which may be the same or different, and/or more than one second layer, which may be the same or different, may be applied to the substrate as desired. Additionally, steps may be performed sequentially or two or more steps may be combined and performed simultaneously. Steps (b) and (c) may also be performed repetitively such that several repeating and alternating layers of at least one first-applied coating and at least one second-applied coating are on the substrate.

After application of the second coating composition over the first-applied coating composition, one or both of the first-and-second-applied compositions are dried or cured. In an embodiment of the present invention, the substrate may be heated to a temperature and for a time sufficient to substantially cure one or both of the first- and second-applied coating compositions to form a multi-component composite coating composition on the substrate. The curing times and temperatures may be designed to allow curing of the multi-component composite coating composition simultaneously with electrodeposited and/or decorative paints applied to the Class A surface of the substrate.

The ratio of the thickness of the first-applied coating composition to that of the second-applied composition is typically 10 to 1:1 to 10, or 5 to 1:1 to 5.

The coated substrate with a combined wet thickness, for example, of 0.30 to 0.35 cm as prepared by the process of the present invention typically has a sound damping value of 0.1 or greater Oberst dissipation factor as determined at a normalized value of 200 Hz in accordance with ASTM E-756-98 over a wide temperature range, much wider than typically achieved by prior art systems. A range of at least 20 Celsius degrees is typical over which the coated substrate prepared by the process of the present invention maintains a sound damping value of 0.1 or greater; for example, a range of from 5° C. to 25° C., or from 0° C. to 20° C., or from −20° C. to 0° C. A range of at least 30 Celsius degrees is common, for example, of from −5° C. to 25° C., or from −20° C. to 5° C., and a range of at least 40 Celsius degrees, for example, from 10° C. to 50° C., is more common. This is in contrast to sound damping coatings of the prior art, for which sound dissipation values can drop off at the low and high end of a narrow ambient temperature range. Sound damping values between 0.1 to 0.15 are common and values greater than 0.15 are more common. In a particular embodiment of the present invention, the coated substrate has a sound damping value of 0.2 or greater Oberst dissipation factor as measured at a normalized value of 200 Hz in accordance with ASTM E-756-98, over a temperature range of at least 20 Celsius degrees. By "normalized value" is meant that while a sound damping measurement may not be taken at 200 Hz in the test method, a value may be determined by graphing measurements taken at other frequencies and interpolating a value at a frequency of 200 Hz. It would be understood by those skilled in the art that the measured sound damping value may vary with total film thickness as well as the temperature or temperature range over which measurements are made. Also, it should be understood that for some end use applications a lower sound damping value may be acceptable. For example, for household appliances such as washers and dryers, a lower sound damping value might be acceptable. In such cases, a lower total wet film thickness such as 0.20 to 0.25 cm (at optimized film ratios) may be desirable, and typically will provide a sound damping value of 0.05 or greater Oberst dissipation factor.

The following examples are intended to illustrate various embodiments of the invention, and should not be construed as limiting the invention in any way. Unless otherwise indicated, all parts are by weight (grams).

EXAMPLES

Synthesis of Blocked Isocyanate Polymers

Example A

A four-neck flask was equipped with stirrer, thermocouple, distillation condenser, and nitrogen inlet. 159.6-gram toluene diisocyanate (80% 2,4 and 20% 2,6 isomers) was added to the flask and heated to 40° C. A mixture of 550.5 grams of PPG1025 (polypropylene glycol available from Bayer Corporation) and 0.4 gram of dibutyltin dilaurate was added to the flask over 30 minutes. The temperature of the reaction mixture was raised to 70° C. and it was held at that temperature for 7.0 hours. Then 131.2 grams of 2(2-n-butoxyethoxy) ethanol (Butyl Carbitol) was added over 10 minutes. After the addition, the temperature was raised to 100° C. After 1 hour 45 minutes the resin was cooled to room temperature. IR spectrum confirmed the absence of isocyanate groups in the polymer. The number average molecular weight of the polymer was 4410.

Example B

A four-neck flask was equipped with stirrer, thermocouple, distillation condenser, and nitrogen inlet. 245.8 gram isophorone diisocyanate was added to the flask and heated to 40° C. A mixture of 663.2 grams of PPG1025 and 1.0 gram of dibutyltin dilaurate was added to the flask over 23 minutes. The temperature of the reaction mixture was raised to 80° C. and it was held at that temperature for 3.0 hours. Then 135.7 grams of ε-caprolactam was added and the temperature was raised to 100° C. After 4 hours 40 minutes the resin was cooled to room temperature. IR spectrum confirmed the absence of isocyanate groups in the polymer. The number average molecular weight of the polymer was 3200.

Examples 1-4 demonstrate the preparation of coating compositions useful in the process of the present invention. Examples 1 and 2 are illustrative of coating compositions useful as the first-applied coating composition, and Examples 3 and 4 illustrate coating compositions useful as the second-applied coating composition. In each Example, components were added to the mixture in the order listed under constant agitation.

TABLE 1

| | First-Applied Coating Composition | | | Second-Applied Coating Composition | | |
|---|---|---|---|---|---|---|
| | Example 1 | Example 2 | | | Example 3 | Example 4 |
| Resin (1) | 50 | | EPON 828 (11) | | 30.16 | 30.16 |
| Resin (2) | | 50 | Dicy (12) | | 3.9 | 3.9 |
| Polyester (3) | 4 | 4 | Diuron (13) | | 0.69 | |
| Jeffamine T-403 (4) | 6.31 | 3.39 | Polyurea (14) | | | 7 |
| Capa 3091 (5) | | 7.74 | Cardolite NC 513 (15) | | 11.7 | 11.7 |
| K-KAT XC-8203 (6) | 1 | 1 | DER 736 (16) | | 2.6 | 2.6 |
| Garamite 1210 (7) | 5 | 5.5 | Winnofil SPT | | 8.85 | 8.85 |
| Mica A-325 (8) | 12.5 | 12.5 | Garamite 1210 | | 2 | 2 |

TABLE 1-continued

| First-Applied Coating Composition | | | Second-Applied Coating Composition | | |
|---|---|---|---|---|---|
| | Example 1 | Example 2 | | Example 3 | Example 4 |
| Winnofil SPT (9) | 7.5 | 7.5 | Mica A-325 | 46.02 | 46.02 |
| Bentone 38 (10) | 3 | 3 | Cabosil M-5 (17) | 1.2 | 1.2 |

(1) Blocked isocyanate from synthesis example A
(2) Blocked isocyanate from synthesis example B
(3) Diethylene glycol adipate. This polyester comprises 45.4 weight percent adipic acid and 54.6 percent of diethylene glycol. It has a number average molecular weight ranging from 1,000 to 5,000, an acid value less than 10, and a hydroxyl value of approximately 110.
(4) A trifunctional amine commercially available from Huntsman Chemical
(5) Polycaprolactone triol from Solvay Caprolactones
(6) A bismuth carboxylate catalyst from King Industries
(7) An alkyl quaternary ammonium clay from Southern Clay Products, Inc.
(8) A potassium alumina silicate from Pacer Corp.
(9) A stearic acid coated calcium carbonate from ICI Americas, Inc.
(10) An organophilic clay from Elementis Specialties
(11) Diglycidyl ether of Bisphenol A commercially available from Resolution Performance Products Corp.
(12) Dicyandiamide from Pacific Anchor Chemical Corp.
(13) 3-(3,4-dichlorophenyl)-1,1-dimethylurea from DuPont Chemicals
(14) Polyurea P8091 available from PPG Industries, A & S.
(15) Aliphatic/aromatic monoepoxide from Cardolite Corp.
(16) Diepoxide of polypropylene glycol from Dow Corp.
(17) Fumed silica from Cabot Corp.

In the Examples according to the invention (labeled I to IV), a first coating composition and a second coating composition were each applied to an Oberst Bar measuring 9 inches (L)×0.5 inch (W)×0.032 inch (T) (22.86×1.27×0.081 cm). The test material was applied onto an Oberst bar at 0.12 inch (0.305 cm) total film thickness with a draw down bar or a template. One inch (2.54 cm) of the bar from one end was left uncovered. In three Comparative Examples (labeled C-I to C-III), a single layer of a coating composition was applied to an Oberst bar. The coated bars were then baked at 180° C. for 30 minutes. After the bake the bars were cooled to ambient temperature for 10 minutes and baked again at 165° C. for another 25 minutes to simulate a plant condition.

The following table provides sound damping measurements, and cold temperature deflection as a surrogate method to predict print-through resistance for each of eight coating systems. Three of the examples (C-I to C-III) are single-layer Comparative Examples, including a sprayable commercial product available as BPR HD 654 from PPG Industries, Inc., which deforms at cold temperature. One Example (C-IV) is a comparative two-layer system using an anti-flutter composition available as VEB 644/6 from PPG Industries, Inc., as the first-applied layer and BPR 4 available from PPG Industries, Inc., as the second-applied layer, tested on an automotive door not deforming up to −30° C. VEB 644/6 and BPR 4 are commercial products intended for use in separate applications, but tested together as a bi-layer as described in this Example.

The bars were conditioned at room temperature for at least 24 hours before taking an Oberst measurement according to ASTM E-756-98 using B&K signal analyzer type 2035. Measurements were recorded for 200 Hz and 400 Hz at +5° C., +25° C., and +45° C. The same bars were used to measure cold temperature deflection. Initial measurements were taken by placing the bar on a leveled flat surface and pressing the bare end and recording initial deflection of the other end in millimeters. The bar was then placed in a flat horizontal position in a freezer at −25° C. for 20 hours. The final cold temperature deflection measurement was taken as described above within five seconds after removing the bar from the freezer.

TABLE 2

Single Layer vs. Bi-layer Performance Comparison

| | Single Layer | | | Bi-layer | | | | |
|---|---|---|---|---|---|---|---|---|
| Example: | C-I | C-II | C-III | C-IV | I | II | III | IV |
| Second-applied layer | none | none | none | BPR 4RP | Example 3 | Example 3 | Example 4 | Example 4 |
| Wet thickness (inch, cm) | | | | 0.04, 0.10 | 0.04, 0.10 | 0.04, 0.10 | 0.04, 0.10 | 0.04, 0.10 |
| Wet weight (g) | | | | 2.7 | 6.3 | 5.8 | 5.8 | 4.7 |
| First-applied layer | BPR HD-654-1 | Example 4 | Example 2 | VEB-644/6 | Example 1 | Example 2 | Example 1 | Example 2 |
| Wet thickness (inch, cm) | 0.12, 0.30 | 0.12, 0.30 | 0.12, 0.30 | 0.08, 0.20 | 0.08, 0.20 | 0.08, 0.20 | 0.08, 0.20 | 0.08, 0.20 |
| Wet weight (g) | 11.4 | 12.1 | 9.1 | 7.4 | 6.1 | 5.7 | 6.5 | 6.1 |
| Composite | | | | | | | | |
| Baked thickness (inch, cm) | 0.115, 0.292 | 0.157, 0.399 | 0.115, 0.292 | 0.176, 0.447 | 0.189, 0.48 | 0.172, 0.437 | 0.186, 0.472 | 0.18, 0.457 |
| Baked weight (g) | 11.4 | 12.1 | 9.1 | 10.1 | 12.4 | 11.6 | 12.2 | 10.8 |
| Oberst Loss Factor @ 25 C. | | | | | | | | |
| 200 Hz | 0.183 | 0.021 | 0.022 | 0.102 | 0.294 | 0.253 | 0.328 | 0.295 |
| 400 Hz | 0.253 | 0.002 | 0.036 | 0.055 | 0.346 | 0.267 | 0.495 | 0.224 |

TABLE 2-continued

Single Layer vs. Bi-layer Performance Comparison

| | Single Layer | | | Bi-layer | | | | |
|---|---|---|---|---|---|---|---|---|
| Example: | C-I | C-II | C-III | C-IV | I | II | III | IV |
| Oberst Loss Factor @ 5 C. | | | | | | | | |
| 200 Hz | 0.129 | 0.008 | 0.070 | 0.160 | 0.269 | 0.217 | 0.188 | 0.273 |
| 400 Hz | 0.160 | 0.017 | 0.122 | 0.171 | 0.326 | 0.162 | 0.237 | 0.315 |
| Oberst Loss Factor @ 45 C. | | | | | | | | |
| 200 Hz | 0.072 | 0.043 | 0.008 | 0.061 | 0.219 | 0.236 | 0.213 | 0.268 |
| 400 Hz | 0.121 | 0.044 | 0.020 | 0.029 | 0.125 | 0.267 | 0.264 | 0.204 |
| Oberst Bar Deflection @ −25 C. | | | | | | | | |
| Before (mm) | 0 | 6 | 0 | 0.5 | 0 | 0 | 0 | 0 |
| After 20 hrs (mm) | 15 | 14 | 0 | 2 | 0 | 1.5 | 1 | 1.5 |

Bake condition: 30 minutes @ 180 C. + 10 minutes @ room temperature + 25 minutes @ 165 C.
BPR HD-654-1, BPR 4RP, VEB-644/6: Commercial products from PPG Industries The data in the Table demonstrate that over a wide temperature range coating compositions applied to substrates in accordance with the process of the present invention maintain sound damping factors of at least 0.1, and in most cases, at least 0.2, at a normalized frequency of 200 Hz.

Whereas particular embodiments of this invention have been described above for purposes of illustration, it will be evident to those skilled in the art that numerous variations of the details of the present invention may be made without departing from the scope of the invention as defined in the appended claims.

What is claimed is:

1. A process for applying a multi-component composite sound damping coating to a substrate comprising:
   a) providing a substrate having two major surfaces;
   b) applying at least one first coating composition to at least a portion of at least one major surface of the substrate, wherein the first-applied coating composition is a curable film-forming composition comprising:
      (1) at least one polymer having reactive functional groups; and
      (2) at least one curing agent having functional groups reactive with the functional groups of the polymer of (1);
   c) applying at least one second coating composition over at least a portion of the first-applied coating composition, wherein the modulus of elasticity of the first-applied coating composition after curing is at least 50 MPa lower than that of the second-applied coating composition after curing; and
   d) curing one or both of the first-applied and second-applied coating compositions to form a multi-component composite coating on the substrate; wherein the coated substrate has a sound damping value of 0.1 or greater Oberst dissipation factor as determined at a normalized value of 200 Hz in accordance with ASTM E-756-98, over a temperature range of at least 20 Celsius degrees.

2. The process of claim 1, wherein the polymer is selected from a polyester, a polyurethane, a polybutadiene, a polyether, a polycarbonate, a polyamide, a polyurea, a glycidyl ether of polyhydric alcohol and/or a glycidyl ether of polyphenol.

3. The process of claim 1, wherein the polymer has a reactive functional group selected from epoxy, isocyanate, blocked isocyanate, hydroxyl, acid, carbamate, and/or amino groups.

4. The process of claim 1, wherein the first-applied coating composition is applied to the substrate by spraying.

5. The process of claim 1, wherein the second-applied coating composition is applied to the substrate by spraying.

6. The process of claim 1, wherein the first-applied coating composition has a modulus of elasticity less than or equal to 400 MPa at 20° C. after curing.

7. The process of claim 1, wherein the second-applied coating composition has a modulus of elasticity greater than or equal to 100 MPa at 20° C. after any necessary curing.

8. The process of claim 1, wherein the substrate is an automotive substrate having a Class A surface and a non-Class A surface.

9. The process of claim 8, wherein the multi-component composite coating is applied to a non-Class A automotive surface.

10. The process of claim 1, wherein step (c) is performed immediately after step (b) such that the second-applied coating composition is applied over the first-applied coating composition wet-on-wet.

11. The process of claim 1 where in step (b) and step (c) are performed simultaneously.

12. The process of claim 1, wherein the first-applied coating composition and/or the second applied coating composition further comprises a filler selected from vulcanized rubber, colloidal silica, calcium modified precipitated silica, ion exchange silica gel, colloidal alumina, colloidal zirconia, calcium-magnesium carbonate, calcium carbonate, clay, mica, aluminum powder, and/or carbon.

13. The process of claim 1, wherein the second-applied coating composition comprises a curable composition.

14. The process of claim 13, wherein the second-applied coating composition comprises:
   (1) at least one polymer selected from acrylic, polyester, polyurethane, polybutadiene, hydrogenated polybutadiene, polyether, polyamide, polyurea, polycarbonate, glycidyl ethers of polyhydric alcohols, glycidyl ethers of polyphenols, and mixtures thereof, wherein the polymer has reactive functional groups selected from epoxy, isocyanate, blocked isocyanate, hydroxyl, acid, carbamate, amine, and mixtures thereof; and (2) at least one curing agent having functional groups reactive with the functional groups of the polymer of (1) of the second-applied coating.

15. The process of claim 1, wherein the first-applied coating composition comprises:
(1) at least one polyurethane, wherein the polyurethane has isocyanate functional groups or at least partially blocked isocyanate functional groups; and
(2) at least one curing agent selected from polyols, polyamines, and mixtures thereof.

16. The process of claim 14, wherein the second-applied coating composition comprises:
(1) at least one polymer selected from glycidyl ethers of polyhydric alcohols, glycidyl ethers of poly phenols, and mixtures thereof, wherein the polymer has epoxy functional groups; and
(2) at least one curing agent comprising dicyandiamide.

17. The process of claim 1, wherein the ratio of the thickness of the first-applied coating composition to the thickness of the second-applied coating composition is 5 to 1:1 to 5.

18. The process of claim 1, wherein the coated substrate has a sound damping value of 0.1 or greater Oberst dissipation factor as determined at a normalized value of 200 Hz in accordance with ASTM E-756-98 from 5° C. to at least 25° C.

19. The process of claim 1, wherein the coated substrate has a sound damping value of 0.1 or greater Oberst dissipation factor as determined at a normalized value of 200 Hz in accordance with ASTM E-756-98 from 5° C. to at least 45° C.

20. The process of claim 1, wherein steps (b) and (c) are performed repetitively such that several repeating and alternating layers of at least one first-applied coating and at least one second-applied coating are on the substrate.

21. The process of claim 1 wherein the first coating composition is applied by a method chosen from spraying, extruding, brushing and dipping.

22. The process of claim 1 wherein the second coating composition is applied by a method chosen from spraying, extruding, brushing and dipping.

23. The process of claim 1 wherein the first coating composition and the second coating composition are different.

* * * * *

UNITED STATES PATENT AND TRADEMARK OFFICE
CERTIFICATE OF CORRECTION

PATENT NO. : 7,288,290 B2
APPLICATION NO. : 11/136155
DATED : October 30, 2007
INVENTOR(S) : Tien-Chieh Chao et al.

Page 1 of 1

It is certified that error appears in the above-identified patent and that said Letters Patent is hereby corrected as shown below:

Column 15, Line 65, (Claim 2)

"polycarhonate" should be -- polycarbonate --

Signed and Sealed this

Eighth Day of April, 2008

JON W. DUDAS
*Director of the United States Patent and Trademark Office*